United States Patent
Hu (10) Patent No.: US 9,705,224 B2
(45) Date of Patent: Jul. 11, 2017

(54) CARD CONNECTOR HAVING PRE-ASSEMBLED EJECTOR SHAFT

(71) Applicant: FOXCONN INTERCONNECT TECHNOLOGY LIMITED, Grand Cayman (KY)

(72) Inventor: Gang Hu, Huaian (CN)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 15/173,965

(22) Filed: Jun. 6, 2016

(65) Prior Publication Data

US 2016/0359268 A1    Dec. 8, 2016

(30) Foreign Application Priority Data

Jun. 5, 2015 (CN) .......................... 2015 1 0301756

(51) Int. Cl.
 *H01R 13/62* (2006.01)
 *H01R 13/24* (2006.01)
 *G06K 7/00* (2006.01)

(52) U.S. Cl.
 CPC ........... *H01R 13/2442* (2013.01); *G06K 7/00* (2013.01)

(58) Field of Classification Search
 CPC   H01R 23/7005; H01R 13/633; H01R 13/518; H01R 23/7068; G06K 13/08; G06K 7/0021
 USPC ....... 439/64, 159, 160, 377, 540.1, 630, 631
 See application file for complete search history.

(56) References Cited

U.S. PATENT DOCUMENTS

| 6,056,601 | A | * | 5/2000 | Pollock | H01R 12/716 439/44 |
| 6,089,889 | A | * | 7/2000 | Chiou | H01R 13/6335 439/157 |
| 6,831,832 | B2 | * | 12/2004 | Haager | H05K 7/1461 361/679.35 |
| 6,991,480 | B2 | * | 1/2006 | Katayanagi | G06K 7/0043 439/159 |
| 7,344,416 | B2 | * | 3/2008 | Quijin | G06K 7/0034 439/540.1 |
| 7,431,618 | B2 | * | 10/2008 | Jin | H01R 27/00 439/630 |
| 7,811,106 | B2 | * | 10/2010 | Lin | G06K 13/08 439/159 |
| 8,203,851 | B2 | * | 6/2012 | Boetzer | H05K 7/1409 361/801 |

(Continued)

FOREIGN PATENT DOCUMENTS

| CN | 203312488 | 11/2013 |
| TW | M454643 | 6/2013 |

*Primary Examiner* — Thanh Tam Le
(74) *Attorney, Agent, or Firm* — Wei Te Chang; Ming Chieh Chang (57) ABSTRACT

A card connector includes an insulative housing defining a front-and-rear direction, a number of contacts accommodated in the insulative housing, a metallic shell enclosing the insulative housing to form a receiving space and an ejector having a shaft received in the right of the receiving space and an actuator driven by the ejector. The metallic shell has a receiving slot receiving the shaft, and an upper wall and a lower wall around the receiving slot. The upper wall and the lower wall restrict the shaft in an up-and-down direction perpendicular to the front-and-rear direction.

17 Claims, 6 Drawing Sheets

(56) References Cited

U.S. PATENT DOCUMENTS

| | | | | |
|---|---|---|---|---|
| 8,568,174 B2 * | 10/2013 | Liu | ............... | H01R 27/02 439/630 |
| 8,662,907 B1 * | 3/2014 | Lin | ............... | G06K 13/08 439/159 |
| 8,777,669 B2 * | 7/2014 | Hu | ............... | H01R 12/714 439/159 |
| 8,961,207 B2 * | 2/2015 | Lim | ............... | G06K 7/0021 439/159 |
| 8,968,029 B2 * | 3/2015 | Yun | ............... | H01R 12/714 439/159 |

* cited by examiner

CARD CONNECTOR HAVING PRE-ASSEMBLED EJECTOR SHAFT

BACKGROUND OF THE INVENTION

1. Field of the Invention

The present invention relates generally to a card connector and a method of assembling same, and more particularly to a card connector with pre-assembled ejector shaft.

2. Description of Related Arts

Taiwan Patent No. M454643, issued on Jun. 1, 2013, discloses a card connector comprising an insulative housing, a plurality of contacts accommodated in the insulative housing, a shaft assembled to the insulative housing, an actuator coordinated with the shaft, and a shielding shell. The insulative housing usually defines at a side thereof a receiving groove for receiving the shaft.

An improved card connector is desired.

SUMMARY OF THE INVENTION

Accordingly, an object of the present invention is to provide a card connector reducing the manufacturing ejection rate.

To achieve the above object, a card connector includes: an insulative housing defining a front-and-rear direction; a number of contacts accommodated in the insulative housing; a metallic shell enclosing the insulative housing to form a receiving space; and an ejector having a shaft received in the right of the receiving space and an actuator driven by the ejector; wherein the metallic shell has a receiving slot receiving the shaft, and an upper wall and a lower wall around the receiving slot, the upper wall and the lower wall restrict the shaft in an up-and-down direction perpendicular to the front-and-rear direction.

Other objects, advantages and novel features of the invention will become more apparent from the following detailed description when taken in conjunction with the accompanying drawings.

DETAILED DESCRIPTION OF THE PREFERRED EMBODIMENT

Reference will now be made in detail to the preferred embodiment of the present invention.

Referring to FIGS. 1 to 6, a card connector 100 of the present invention comprises an insulative housing 1, a plurality of contacts 2 accommodated in the insulative housing 1, a metallic shell 3 enclosing the insulative housing 1 to form a receiving space 10, and a tray 4, an ejector 5 and a detective contact 6 received in the receiving space 10. Two cards (not shown) are carried by the tray 4 to be received in the receiving space 10 along an insertion direction, and are withdrawn from the receiving space 10 by the ejector 5 along an ejection direction opposite to the insertion direction. The insertion/ejection direction is so-called front-and-rear direction.

Figure 2:
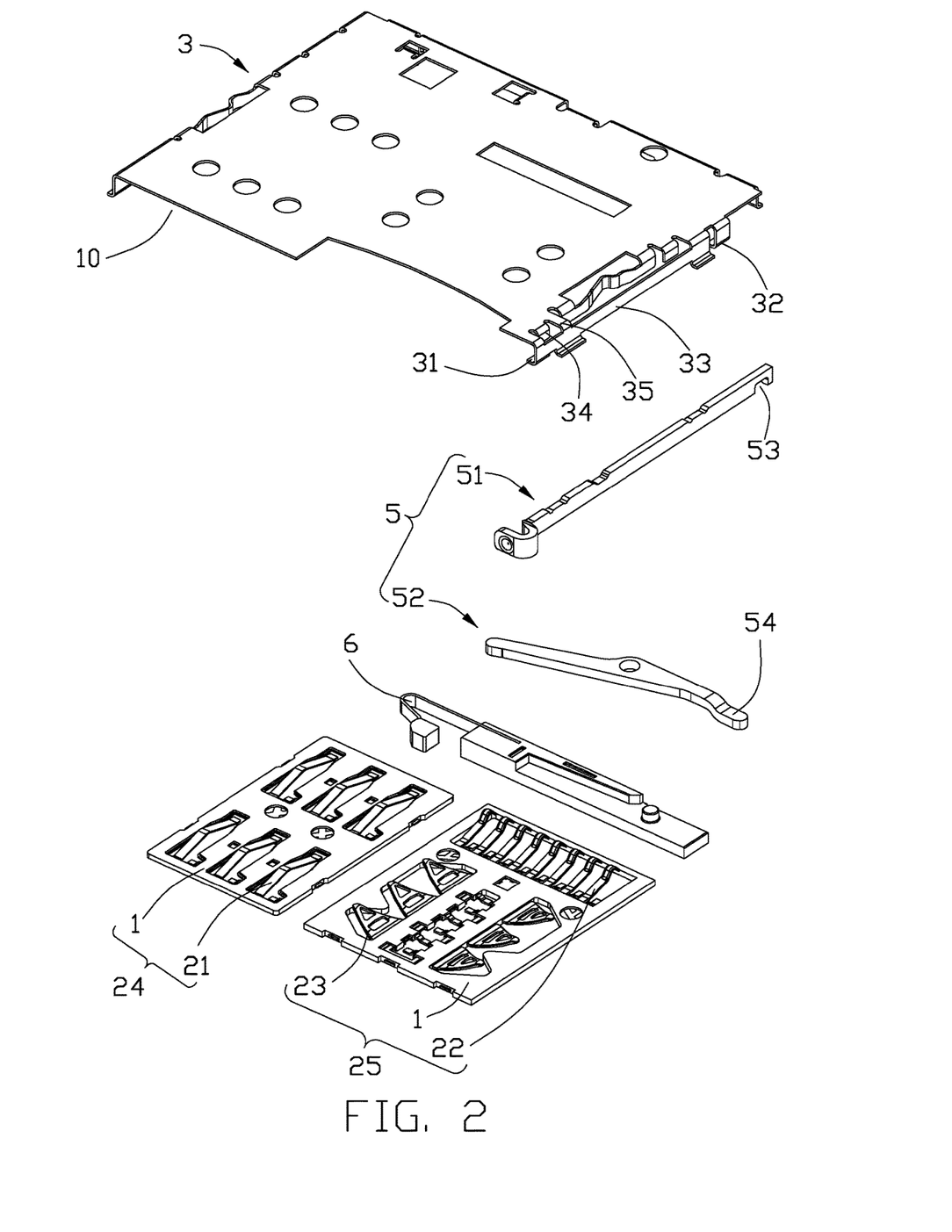
FIG. 2 is a perspective, exploded view of the card connector of FIG. 1.
Figure 3:
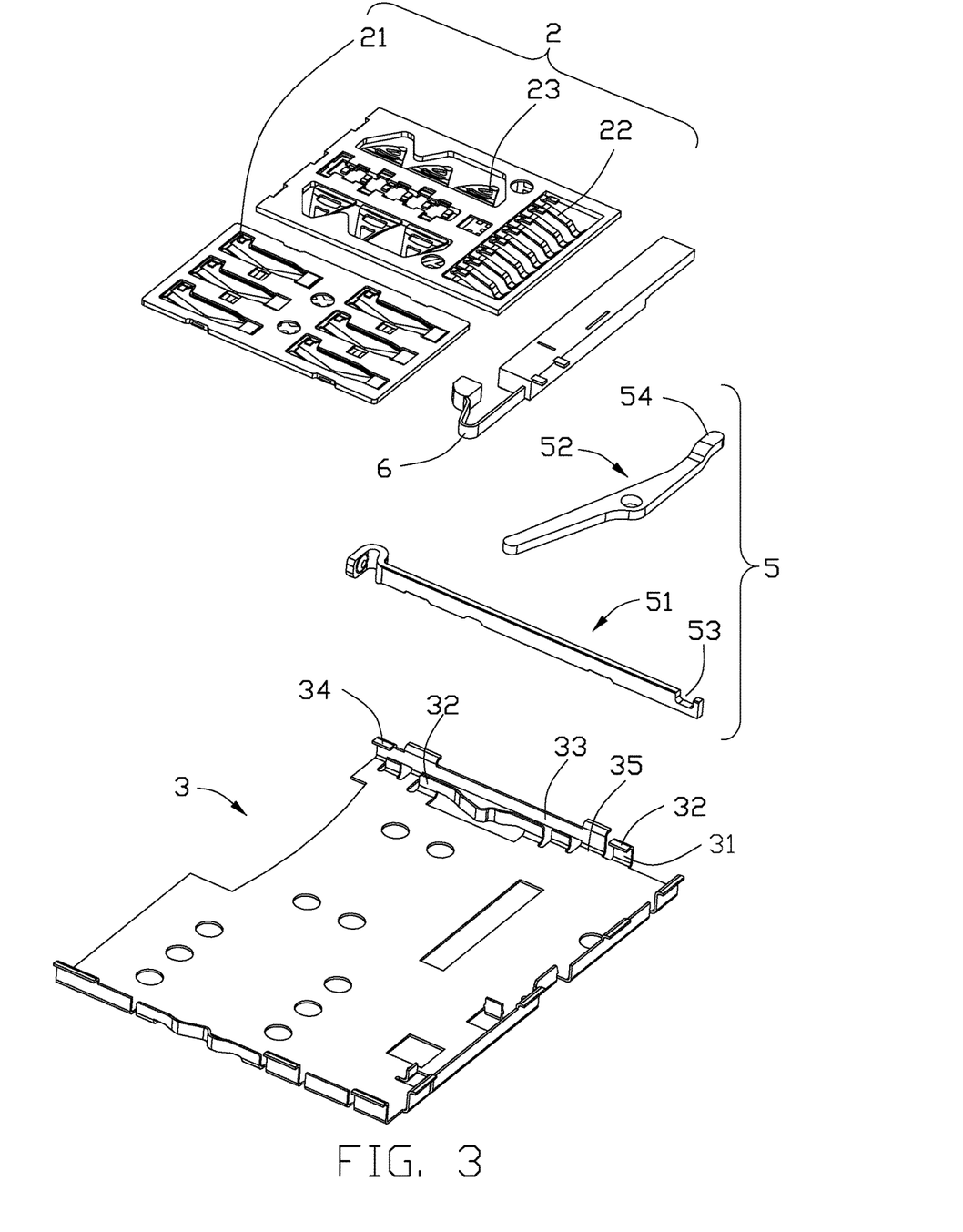
FIG. 3 is similar to FIG. 2, but taken from a different view.
Figure 4:
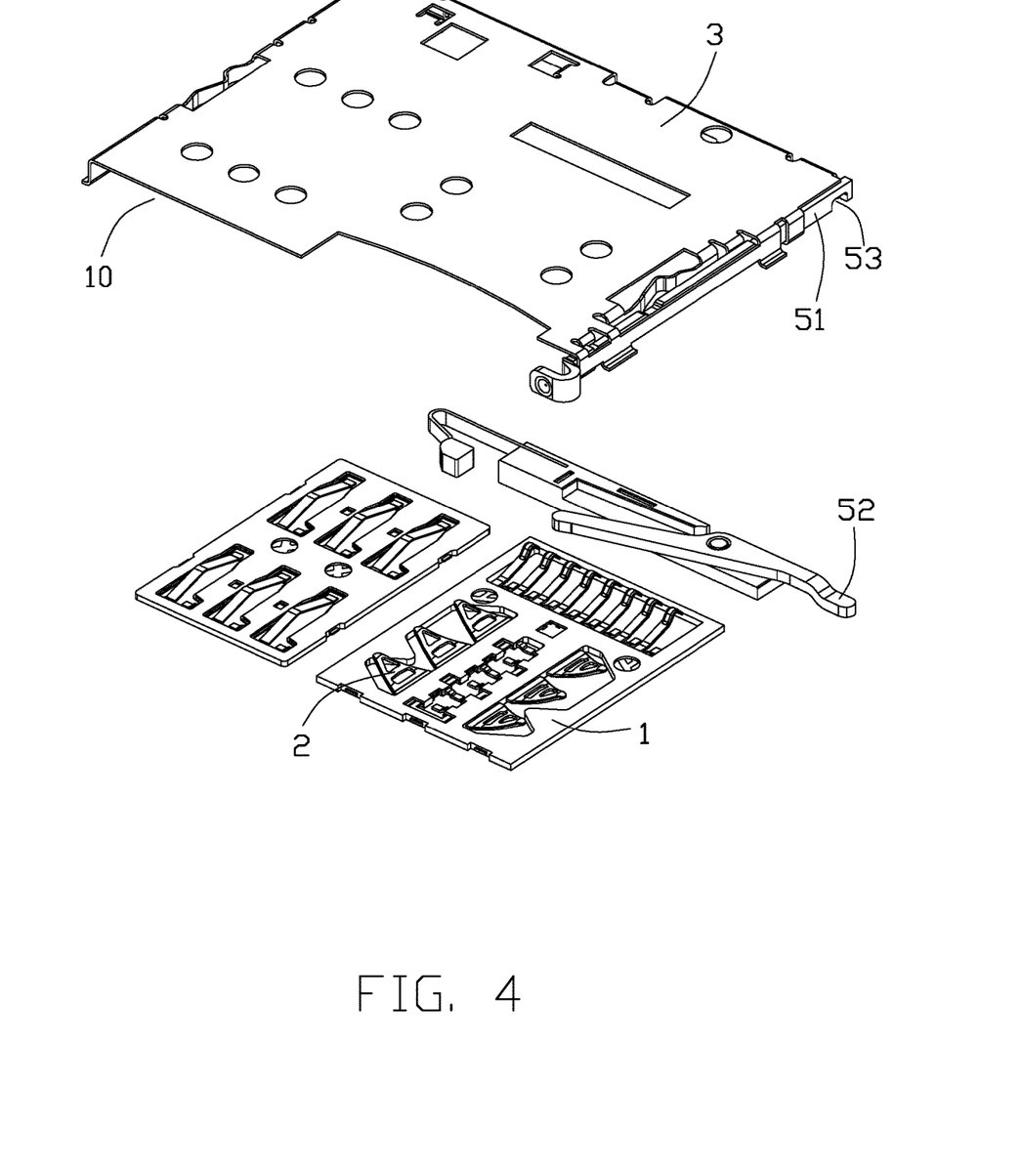
FIG. 4 is a perspective, partially assembled view of a card connector of FIG. 2.

The contacts 2 comprise a plurality of first contacts 21 located on the left, a plurality of second contacts 22 and a plurality of third contacts 23 located on the right. The first contacts 21 are arranged in two transverse rows in the front-and-rear direction. The second contacts 22 are located behind the third contacts 23, the second contacts 22 are arranged in a transverse row, and the third contacts 23 are arranged in two vertical rows. The first contacts 21 and the third contacts 23 are used to connect a micro SIM card electrically. The second contacts 22 are used to connect a micro SD card electrically. The insulative housing 1 and the contacts 2 are molded by insert-molding process. The first contacts 21 and a part of the insulative housing 1 are molded to form a first contact module 24. The second contacts 22, the third contacts 23 and another part of the insulative housing 1 are molded to form a second contact module 25. The first contact module 24 and the second contact module 25 are assembled to a printed circuit board (not shown). The modularity design is easy to control a coplanarity of the first contact module 24 and the second contact module 25 and replace one module of the first contact module 24 and the second contact module 25.

The tray 4 is moveably received in the receiving space and comprises a first receiving groove 41 located on the left, a second receiving groove 42 located on the right and a third receiving groove 43 located on the right and partially overlapping the second receiving groove 42. The dimension in the left-and-right direction of the card connector 100 is bigger than the dimension in the front-and-rear direction of the card connector 100, so that the detective contact 6 and the actuator 52 are positioned in two sides of the receiving space 10 without any interference. The first receiving groove 41 is associated with the first contacts 21, the second receiving groove 42 is associated with the second contacts 22 and the third receiving groove 43 is associated with the third contacts 23. The tray 4 is capable of receiving two micro SIM cards or receiving a micro SIM card and a micro SD card. While two micro SIM cards are received to the tray 4, the first contacts 21 and the third contacts 23 are connected with one of the micro SIM cards receptively. While a micro SIM card and a micro SD card are received to the tray 4, the first contacts 21 is connected with the micro SIM card, and the third contacts 23 is connected with the micro SD card. The second receiving groove 42 and the third receiving groove 43 are partially lapped, so that the second contacts 22 and the third contacts 23 can not be used at the same time.

Figure 1:
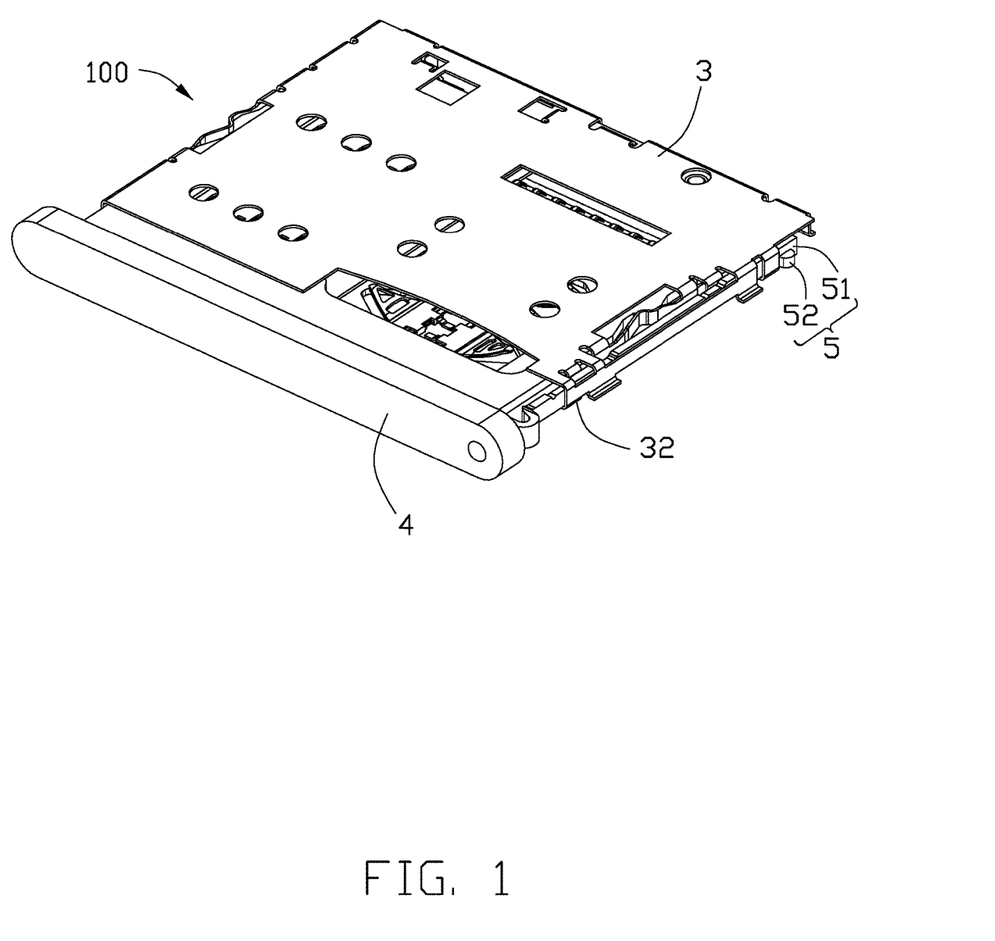
FIG. 1 is a perspective, assembled view of a card connector constructed in accordance with the present invention.
Figure 6:
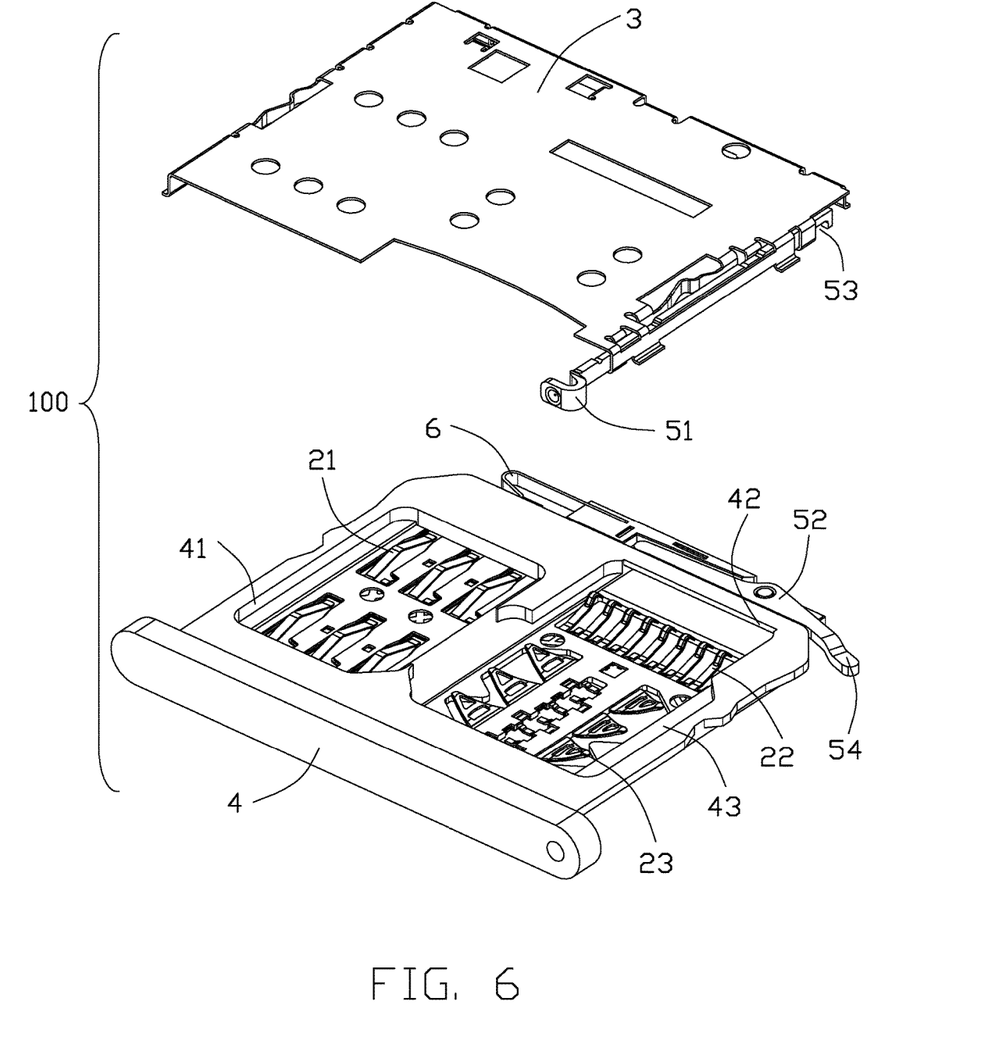
FIG. 6 is a perspective, furtherly assembled view of a card connector of FIG. 4.

Referring to FIGS. 1 and 6, the ejector 5 comprises a shaft 51 received in the right of the receiving space 10 and an actuator 52 driven by the ejector 5. The shaft 51 is positioned upon the actuator 52. The actuator 52 and the detective contact 6 are received in the rear of the receiving space 10, and the detective contact 6 is located on the left of the actuator 52. The shaft 51 defines a downward opening 53 for seizing the actuator 52 and the actuator 52 has a tail end 54 bent downwardly from a rear end thereof and corresponding with the opening 53. The tail end 54 looks like a step and is caught by the opening 53. In another embodiment of the invention, the shaft 51 also can be positioned on the left of the receiving space 10, and the actuator 52 is positioned on the left of the actuator 52.

Figure 5:
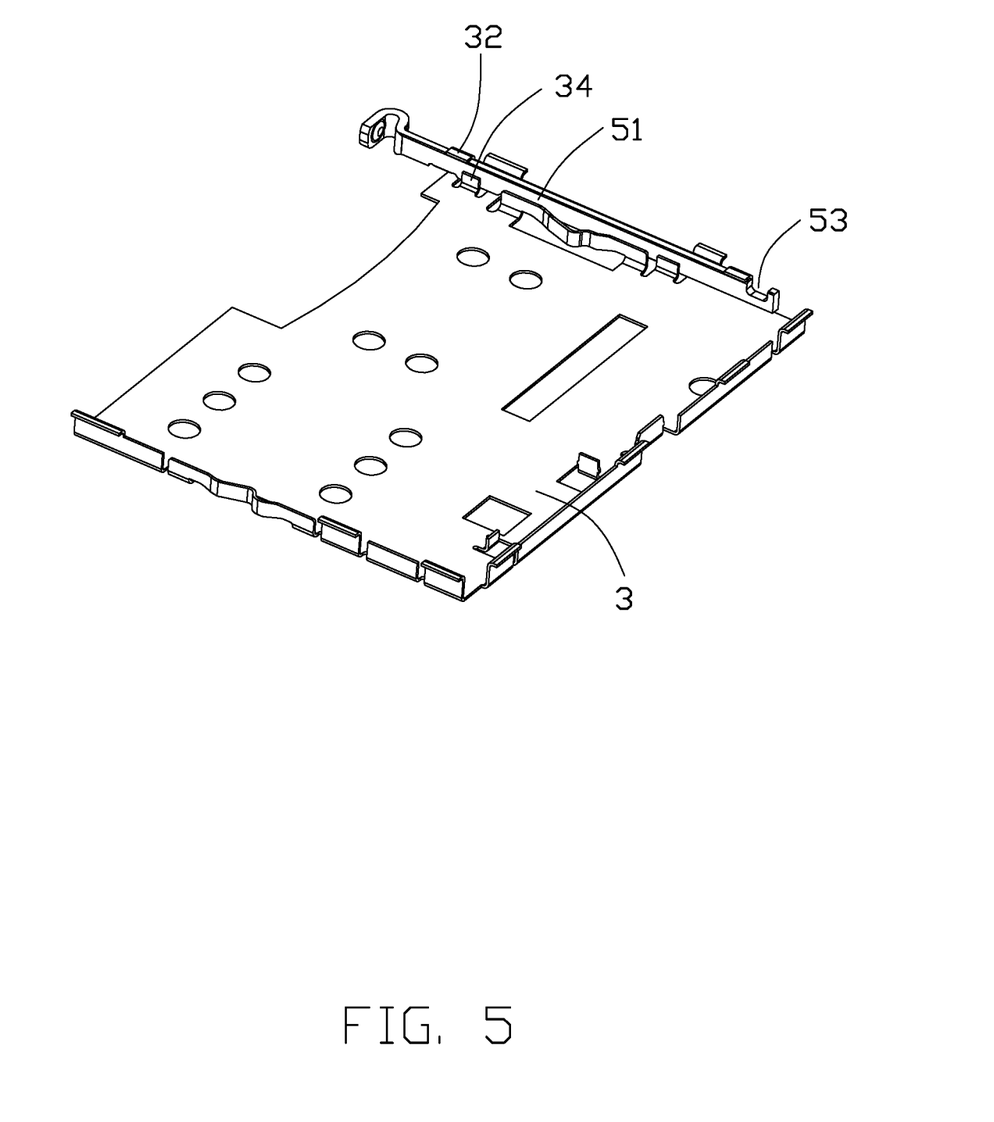
FIG. 5 is a perspective, assembled view of a metallic and a shaft of the card connector of FIG. 4.

Referring to FIGS. 2 and 5, the metallic shell 5 comprises a receiving slot 31 receiving the shaft 51, and a left wall 34, a right wall 33, an upper wall 35 and a lower wall 32 around the receiving slot 31. The left wall 34 and the right wall 33 restrict the shaft 51 in a left-and-right direction perpendicular to the front-and-rear direction. The upper wall 35 and the lower wall 32 restrict the shaft 51 in an up-and-down direction perpendicular to the front-and-rear direction. The receiving slot 31 receiving the shaft 51 is installed in the metallic shell 5 instead of installing a receiving slot in the insulative housing 1 in a conventional technology so as to reduce rejection rate during manufacturing.

A method of making a card connector 100 comprises the steps of: providing an insulative housing 1 and a plurality of contacts 2 accommodated in the insulative housing 1, the insulative housing 1 and the contacts 2 are molded to form a plurality of contact modules by insert-molding process; providing an ejector (mechanism) 5 comprising an operation shaft 51 and an actuator 52 driven by the ejector 5, the shaft 51 defining a downward opening 53, and the actuator 52 having a tail end 54 bent downwardly from a rear end thereof; providing a metallic shell 3 defining a receiving slot 31, an upper wall 35 and a lower wall 32 around the receiving slot 31 and a left wall 34 and right wall 33 around the receiving slot 31; inserting the shaft 51 to the receiving slot 31 of the metallic shell 3; assembling the metallic shell 3 together with the shaft 51 to the insulative housing 1 to form a receiving space 10 and assembling the shaft 51 to the actuator 52 in the receiving space 10 by the opening 53 and the tail end 54.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. A card connector comprising:
   an insulative housing defining a front-and-rear direction;
   a plurality of contacts accommodated in the insulative housing;
   a metallic shell enclosing the insulative housing to form a receiving space;
   a tray moveably received in the receiving space; and
   an ejector comprising a shaft received at a side of the receiving space and an actuator driven by the shaft; wherein
   the metallic shell comprises a receiving slot receiving the shaft, and an upper wall and a lower wall around the receiving slot, the upper wall and the lower wall restrict the shaft in an up-and-down direction perpendicular to the front-and-rear direction; and
   the metallic shell further comprises a left wall and a right wall around the receiving slot, and the left wall and the right wall restrict the shaft in a left-and-right direction perpendicular to the up-and-down direction.

2. The card connector as claimed in claim 1, wherein the shaft is positioned upon the actuator and defines a downward opening for seizing the actuator, and the actuator has a tail end corresponding with the opening.

3. The card connector as claimed in claim 2, wherein the tail end is bent downwardly from a rear end of the actuator.

4. The card connector as claimed in claim 1, wherein the contacts comprise a plurality of first contacts and a plurality of second contacts arranged in the left-and-right direction, and the tray defines a first receiving groove and a second receiving groove associated with the first contacts and the second contacts respectively.

5. The card connector as claimed in claim 4, further comprising a detective contact located on the opposite side of the actuator in the receiving space in the left-and-right direction.

6. The card connector as claimed in claim 4, wherein the tray further comprises a third receiving groove located at the same side of the second receiving groove and partially overlapping the second receiving groove, and the contacts further comprise a plurality of third contacts associated with the third receiving groove.

7. The card connector as claimed in claim 6, wherein the first contacts and a part of the insulative housing are insert-molded to form a first contact module, and the second contacts, the third contacts, and another part of the insulative housing are insert-molded to form a second contact module.

8. A method of making a card connector, comprising the steps of:
   providing an insulative housing and a plurality of contacts accommodated in the insulative housing;
   providing an ejector comprising a shaft and an actuator driven by the ejector;
   providing a metallic shell defining a receiving slot and an upper wall and a lower wall around the receiving slot;
   inserting the shaft to the receiving slot of the metallic shell;
   assembling the metallic shell together with the shaft to the insulative housing to form a receiving space while assembling the shaft to the actuator in the receiving space; wherein
   the step of providing the insulative housing and the contacts comprises insert-molding the insulative housing and the contacts to form a plurality of contact modules.

9. The method as claimed in claim 8, wherein the step of providing the metallic shell comprises providing the metallic shell further with a left wall and a right wall around the receiving slot.

10. The method as claimed in claim 9, wherein the step of providing the ejector comprises providing the shaft with a downward opening and the actuator with a tail end.

11. The method as claimed in claim 10, wherein the step of providing the ejector comprises providing the actuator with a tail end bent downwardly from a rear end thereof.

12. The method as claimed in claim 10, wherein the step of assembling comprises assembling the opening to the tail end.

13. An electrical card connector comprising:
   an insulative housing;
   a metallic shell assembled upon the housing and cooperating with said housing to commonly form a card receiving space therebetween in a vertical direction;
   a plurality of contacts disposed in the housing with corresponding contacting sections exposed in the card receiving space;
   an ejector mechanism located behind the card receiving space in a front-to-back direction perpendicular to said vertical direction, and including a pivotal actuator with one end linked to an operation shaft which is back and forth moveable along the front-to-back direction; wherein
   the operation shaft is retained by the shell in the vertical direction in a pre-assembled manner, and further engaged with the pivotal actuator for forming a linking relation therebetween after the shell is assembled upon the hosing in said vertical direction, so as to result in a pivotal movement of the actuator in response to a back-and-forth movement of the shaft along said front-to-back direction.

14. The electrical card connector as claimed in claim 13, wherein a distal end of the shaft forms a downward opening to receive a tail end of the actuator for result in linking between the shaft and the actuator.

15. The electrical card connector as claimed in claim 14, wherein said tail end is downwardly offset from remaining portions of the actuator.

16. The electrical card connector as claimed in claim 13, wherein a tray is received within the card receiving space and actuated by said actuator.

17. The electrical card connector as claimed in claim 13, wherein the shell forms a side wall to laterally cover the shaft, and said tail end extends beyond the side wall in a transverse direction perpendicular to both said vertical direction and said front-to-back direction.

* * * * *